United States Patent
Li (10) Patent No.: US 10,913,451 B2
(45) Date of Patent: Feb. 9, 2021

(54) METHOD AND APPARATUS FOR INHIBITING MISOPERATION OF ACTIVE SAFETY FUNCTION OF VEHICLE

(71) Applicants: Zhejiang Geely Automobile Research Institute Co., Ltd., Linhai (CN); Zhejiang Geely Holding Group Co., Ltd., Hangzhou (CN)

(72) Inventor: Bo Li, Linhai (CN)

(73) Assignees: ZHEJIANG GEELY AUTOMOBILE RESEARCH INSTITUTE CO., LTD., Linhai (CN); ZHEJIANG GEELY HOLDING GROUP CO., LTD., Hangzhou (CN)

(*) Notice: Subject to any disclaimer, the term of this patent is extended or adjusted under 35 U.S.C. 154(b) by 345 days.

(21) Appl. No.: 15/751,829

(22) PCT Filed: Jun. 7, 2016

(86) PCT No.: PCT/CN2016/085066
§ 371 (c)(1),
(2) Date: Feb. 9, 2018

(87) PCT Pub. No.: WO2017/024880
PCT Pub. Date: Feb. 16, 2017

(65) Prior Publication Data
US 2018/0229721 A1   Aug. 16, 2018

(30) Foreign Application Priority Data
Aug. 12, 2015  (CN) .......................... 2015 1 0492899

(51) Int. Cl.
*B60W 30/09* (2012.01)
*B60W 50/02* (2012.01)
(Continued)

(52) U.S. Cl.
CPC ......... *B60W 30/09* (2013.01); *B60R 16/0238* (2013.01); *B60W 50/0225* (2013.01);
(Continued)

(58) Field of Classification Search
CPC .. B60W 30/09; B60W 50/0225; B60W 50/04; B60R 16/0238
See application file for complete search history.

(56) References Cited

U.S. PATENT DOCUMENTS

| 8,996,224 B1 | 3/2015 | Herbach et al. |
| 2004/0153244 A1 | 8/2004 | Kellum |

(Continued)

FOREIGN PATENT DOCUMENTS

| CN | 101299301 A | 11/2008 |
| CN | 101813492 A | 8/2010 |

(Continued)

*Primary Examiner* — Michael D Lang
(74) *Attorney, Agent, or Firm* — Cheng-Ju Chiang (57) ABSTRACT

A method for inhibiting misoperation of active safety function of vehicle, including steps: detecting the environmental information during vehicle driving; acquiring the current longitude and latitude of the vehicle; determining whether the vehicle needs an intervention of an active safety function according to the detection result; when the vehicle needs an intervention of the active safety function, then comparing the current longitude and latitude of the vehicle with the longitudes and latitudes of inhibition sites in a preset inhibition site list; if the current longitude and latitude of the vehicle is consistent with a specific longitude and latitude in the inhibition site list, inhibiting the activation of the active safety function; and if the current longitude and latitude of the vehicle is not consistent with a specific longitude and latitude in the inhibition site list, sending an intervention instruction to activate the active safety function.

8 Claims, 4 Drawing Sheets

AA: detection result
BB: current longitude and latitude of the vehicle
CC: intervention instruction of active safety function (e.g., automatic emergency braking)

(51) Int. Cl.
*B60W 50/04* (2006.01)
*B60R 16/023* (2006.01)
*G08G 1/16* (2006.01)
*G01S 13/86* (2006.01)
*G01S 13/931* (2020.01)
*B60R 21/0134* (2006.01)

(52) U.S. Cl.
CPC ......... *B60W 50/04* (2013.01); *B60R 21/0134* (2013.01); *B60W 2420/42* (2013.01); *B60W 2540/215* (2020.02); *B60W 2554/00* (2020.02); *B60W 2556/50* (2020.02); *G01S 13/86* (2013.01); *G01S 13/931* (2013.01); *G01S 2013/9321* (2013.01); *G01S 2013/9322* (2020.01); *G01S 2013/9323* (2020.01); *G01S 2013/9324* (2020.01); *G01S 2013/93185* (2020.01); *G08G 1/16* (2013.01); *G08G 1/167* (2013.01)

(56) References Cited

U.S. PATENT DOCUMENTS

| | | |
|---|---|---|
| 2011/0040481 A1 | 2/2011 | Trombley et al. |
| 2014/0025285 A1* | 1/2014 | Trombley .............. G08G 1/161 |
| | | 701/301 |
| 2015/0220796 A1 | 8/2015 | Yokoi |

FOREIGN PATENT DOCUMENTS

| | | |
|---|---|---|
| CN | 103101534 A | 5/2013 |
| CN | 103208205 A | 7/2013 |
| CN | 103350670 A | 10/2013 |
| CN | 104503265 A | 4/2015 |
| CN | 105059214 A | 11/2015 |
| DE | 102010048263 A1 | 5/2011 |
| DE | 102011108865 A1 | 1/2012 |
| WO | 2015/164034 A1 | 10/2015 |

\* cited by examiner

HH: download
KK: updated longitudes and latitudes of the inhibition sites

METHOD AND APPARATUS FOR INHIBITING MISOPERATION OF ACTIVE SAFETY FUNCTION OF VEHICLE

CROSS-REFERENCE TO RELATED APPLICATION

This application is a 35 U.S.C. § 371 National Phase conversion of International (PCT) Patent Application No. PCT/CN2016/085066, filed on Jun. 7, 2016, which claims the priority of Chinese Patent Application No. 201510492899.8, filed on Aug. 12, 2015. The contents of the above-identified applications are incorporated herein by reference. The PCT International Patent Application was filed and published in Chinese.

TECHNICAL FIELD

The present application relates to the technical filed of active safety function of vehicle, and more particularly to a method and an apparatus for inhibiting misoperation of active safety function of vehicle, and a vehicle having active safety function.

BACKGROUND

Vehicle active safety technology is the new trend of current vehicle technology development. Different from the passive safety techniques that focus on the protection of the passengers after collisions, the active safety techniques take risk prevention as the core. That is, the active safety techniques help the drivers control driving of vehicles, and can realize collision warning and intervention for driving operations, so as to prevent traffic accidents in advance. The basic principle of vehicle active safety technology is: using various sensors to obtain the external environment information of the vehicle, after the obtained information is processed by processor, outputting instructions to activate the brake system, the loudspeaker, the signal lights, etc., to achieve the purpose of assisting driving and improving the safety of driving.

In recent years, research on active safety technology is continuously heating up. Based on radar, camera and other environmental sensors, some active safety control systems such as automatic emergency braking control systems, adaptive cruise control systems, lane keeping assistance control systems have become matured and are continued to be optimized. Vehicles having active safety function have got increasing popularity in the market. However, with the popularization of various active safety functions, misoperations of the systems have become one of the key issues of user's complaints and one of the hidden dangers of driving safety. Misoperation refers to the wrong work when not satisfied with the working conditions, for example, when there is no vehicle in front, but there is a metal speed bump, the automatic emergency braking function may be wrongly activated to make an emergency braking for the vehicle due to the false recognition of the sensor.

SUMMARY

The present application is intended to provide a method and an apparatus for inhibiting misoperation of active safety function of vehicle, and a vehicle having active safety function. The vehicle can inhibit activation of active safety function in places where misoperations of active safety function may occur, to prevent happening of misoperation of active safety, and to reduce user's complaints and hidden dangers of driving.

In an embodiment, the present application provides a method for inhibiting misoperation of active safety function of vehicle, including:

detecting the environmental information during vehicle driving;

acquiring the current longitude and latitude of the vehicle via a positioning system;

determining whether the vehicle needs an intervention of an active safety function according to the detection result;

when the vehicle needs an intervention of the active safety function, then comparing the current longitude and latitude of the vehicle with the longitudes and latitudes of inhibition sites in a preset inhibition site list, wherein the inhibition site list includes the longitudes and latitudes of the inhibition sites where misoperations of active safety function have occurred;

if, after comparing, the current longitude and latitude of the vehicle is consistent with or is within a certain range of a specific longitude and latitude in the inhibition site list, inhibiting the activation of the active safety function; and if, after comparing, the current longitude and latitude of the vehicle is not consistent with or is not within a certain range of a specific longitude and latitude in the inhibition site list, sending an intervention instruction to activate the active safety function.

Further, the inhibition site list with the longitudes and latitudes of the inhibition sites is preset in a controller of the vehicle.

Further, the longitude and latitude of the respective inhibition sites in the inhibition site list can be obtained through vehicle road test or user's feedback.

Further, the method further comprises uploading the longitude and latitude of the site where an active safety function is performed together with on-site monitoring information to the Internet through Internet of Vehicles, and if it is determined that the active safety function performed is a misoperation according to the on-site monitoring information, recording the longitude and latitude of the site where the active safety function is performed in an inhibition site list of a data center.

Further, the method further comprises downloading the inhibition site list from the data center to the controller of the vehicle through Internet of Vehicles.

Further, wherein the method further comprises adding construction sites and road congestion information into the inhibition site list.

In an embodiment, the present application further provides an apparatus for inhibiting misoperation of active safety function of vehicle, including:

an external environment sensor, being configured for detecting the environmental information during vehicle driving;

a position information acquiring unit, being configured for acquiring the current longitude and latitude of the vehicle via a positioning system;

a controller, being connected with the external environment sensor and the position information acquiring unit;

an executing device, being connected with the controller;

wherein an inhibition site list is preset in the controller, the inhibition site list includes the longitudes and latitudes of inhibition sites where misoperations of active safety function have occurred, the controller determines whether the vehicle needs an intervention of an active safety function according to the detection result of the external environment sensor, when the vehicle needs an intervention of the active safety function, the controller then compares the current longitude and latitude of the vehicle with the longitudes and latitudes of the inhibition sites in the inhibition site list;

if, after comparing, the current longitude and latitude of the vehicle is consistent with or is within a certain range of a specific longitude and latitude in the inhibition site list, the controller does not send an intervention instruction to the executing device;

if, after comparing, the current longitude and latitude of the vehicle is not consistent with or is not within a certain range of a specific longitude and latitude in the inhibition site list, the controller sends an intervention instruction to the executing device, to cause the executing device to perform the active safety function.

Further, the apparatus further comprises an transmitting unit and a monitoring unit, the transmitting unit is connected with the monitoring unit and the position information acquiring unit, the monitoring unit captures on-site monitoring information at the site where an active safety function is performed, the transmitting unit uploads the longitude and latitude of the site where the active safety function is performed together with the on-site monitoring information to the Internet, and the transmitting unit further downloads the inhibition site list recorded with the longitudes and latitudes of the inhibition sites from the Internet to the controller of the vehicle.

Further, the monitoring unit is on-board camera, the on-site monitoring information is a video recorded by the camera at the site where the active safety function is performed.

In an embodiment, the present application further provides a vehicle having active safety function, and the vehicle includes the above-mentioned apparatus for inhibiting misoperation of active safety function of vehicle.

In the embodiment, the present application provides a method and an apparatus for inhibiting misoperation of active safety function of vehicle. By presetting the longitudes and latitudes of the inhibition sites where misoperations of active safety function have occurred in the inhibition site list of the controller, it is realized to inhibit the activation of the active safety function at these inhibition sites where misoperations of active safety function have occurred, to thereby prevent happening of wrong work of active safety function and reduce user's complaints and hidden dangers of driving.

DETAILED DESCRIPTION OF PREFERRED EMBODIMENTS

In order to make the purposes, characteristics, and advantages of the present application more apparently, the present application will now be described in more detail with reference to the following preferred embodiments when taken in conjunction with the accompanying drawings.

Figure 1:
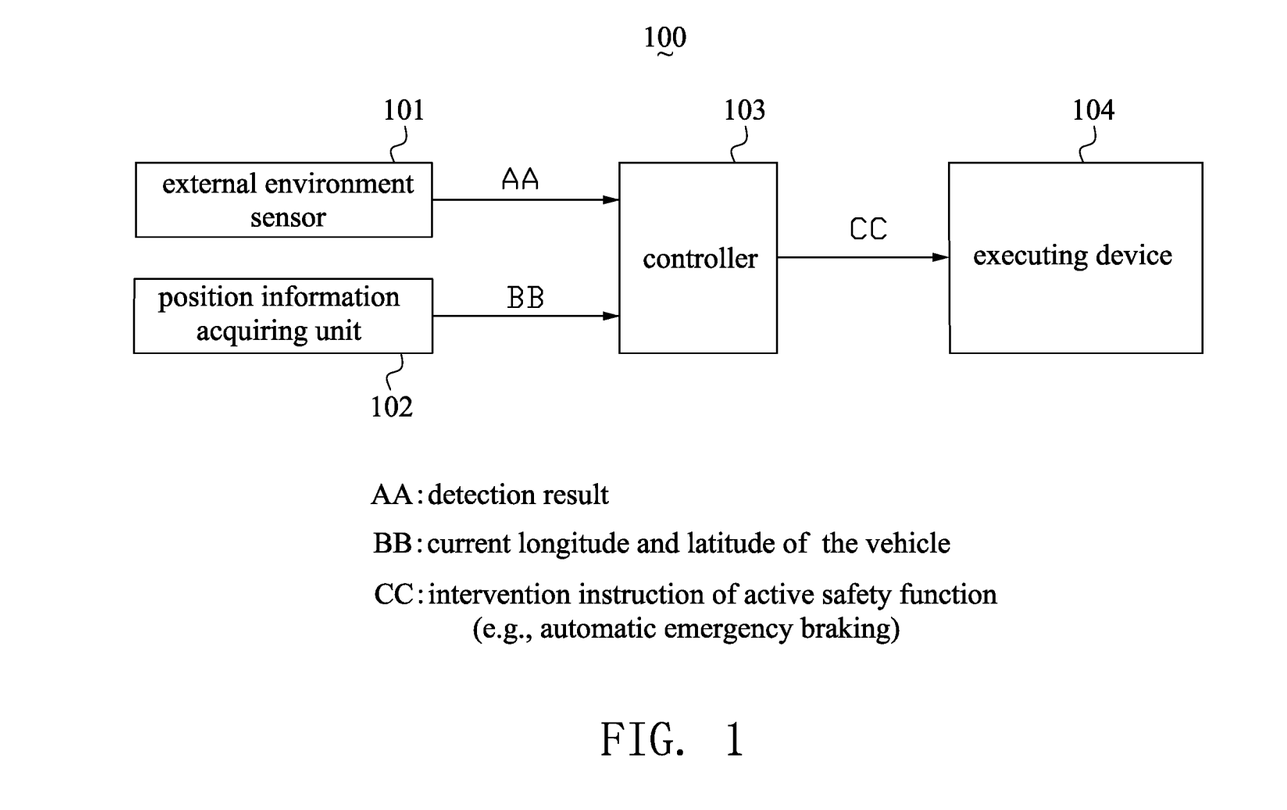
FIG. 1 is a diagram of an apparatus for inhibiting misoperation of active safety function of vehicle according to an embodiment of the present application.

In an embodiment, the present application provides an apparatus for inhibiting misoperation of active safety function of vehicle. The inhibition apparatus is based on a positioning system, and uses the longitude and latitude information from the positioning system to inhibit activation of an active safety function. Referring to FIG. 1, the inhibition apparatus 100 includes an external environment sensor 101, a position information acquiring unit 102, a controller 103 and an executing device 104.

The external environment sensor 101 is configured to detect the environmental information during vehicle driving. Specifically, the external environment sensor 101 may include ultrasonic radar, millimeter wave radar, laser radar, camera, and so on. The environmental information detected during vehicle driving may include the distance between the vehicle and a front vehicle, the speed of a front vehicle, the distance between the vehicle and a rear vehicle, the speed of a rear vehicle, the location of the lane, and so on.

The position information acquiring unit 102 is configured to acquire the current longitude and latitude of the vehicle via the positioning system. Specifically, the positioning system may be, for example, the GPS navigation system, the Beidou navigation system, the Galileo navigation system, etc. The positioning system is used to locate the current longitude and latitude of the vehicle, and the position information acquiring unit 102 acquires the current longitude and latitude of the vehicle via the positioning system. The position information acquiring unit 102 may be an on-board GPS module.

The controller 103 is connected with the external environment sensor 101. The controller 103 may be an ECU (electronic control unit, or called as on-board vehicle computer), or a controller independent of the ECU. The controller 103 receives the detection result of the external environment sensor 101, and determines whether the vehicle needs an intervention of an active safety function according to the detection result. The active safety function may include automatic emergency braking, adaptive cruise control, lane keeping assist, and other functions that can be actively involved in control. The inhibition apparatus may be applied in autonomous driving vehicles.

The controller 103 is further connected with the position information acquiring unit 102. The controller 103 receives the current longitude and latitude of the vehicle as transmitted from the position information acquiring unit 102. An inhibition site list is preset in the controller 103, wherein the inhibition site list includes the longitudes and latitudes of inhibition sites where misoperations of active safety function have occurred. The inhibition site list with the longitudes and latitudes of the inhibition sites is preset in the controller 103 of the vehicle. The longitude and latitude of the respective inhibition sites in the inhibition site list can be obtained through vehicle road test or user's feedback.

Figure 2:
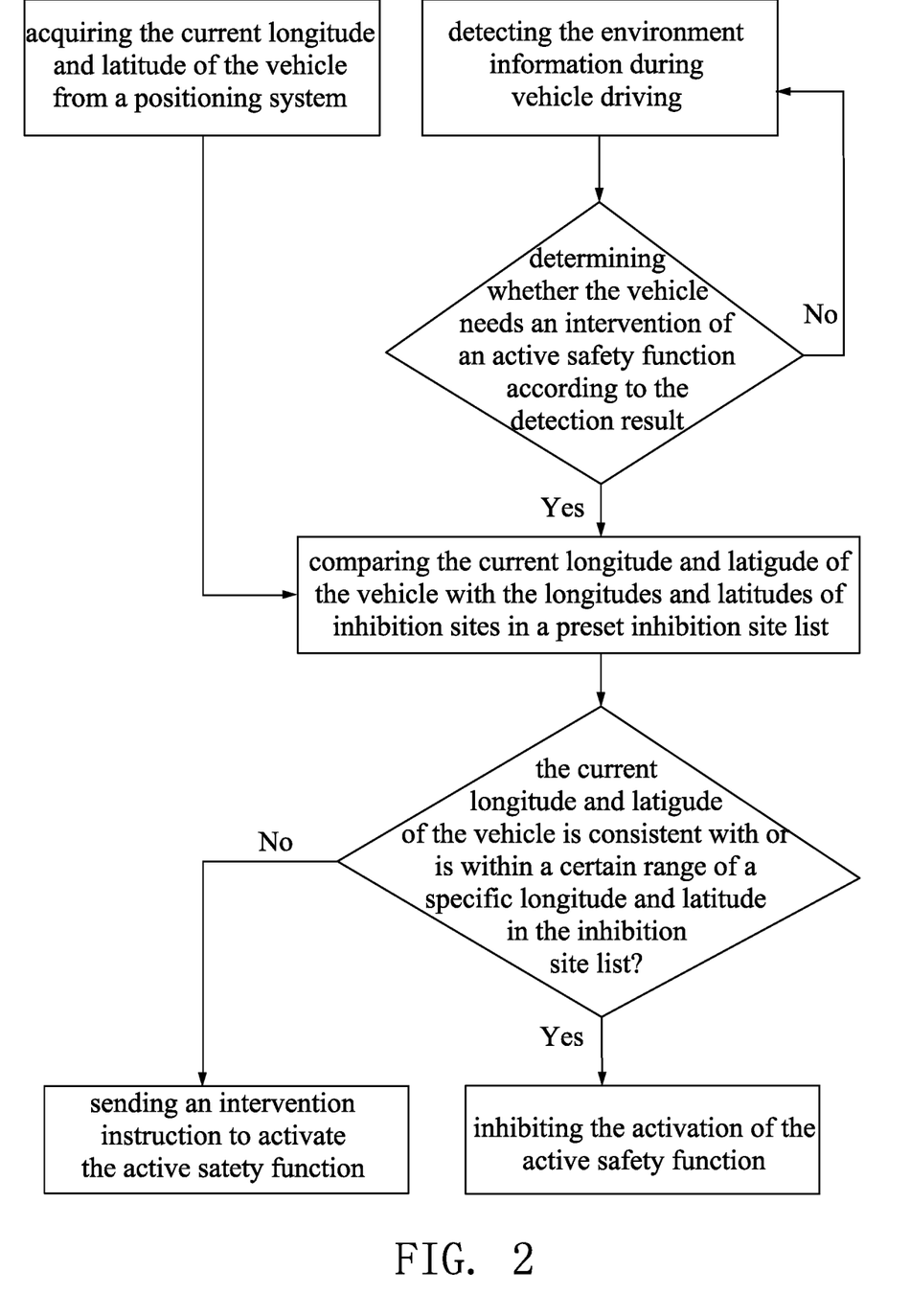
FIG. 2 is a flow chart of a method for inhibiting misoperation of active safety function of vehicle according to an embodiment of the present application.

Referring to FIGS. 1-2, in the embodiment of the present application, the position information acquiring unit 102 is added to the active safety control system and configured for acquiring the current longitude and latitude of the vehicle from the positioning system and transmitting the current longitude and latitude of the vehicle to the controller 103 in real-time. When the controller 103 determines that the vehicle needs an intervention of an active safety function (e.g., automatic emergency braking) according to the detection result of the external environment sensor 101, the controller 103 then compares the current longitude and latitude of the vehicle with the longitudes and latitudes of the inhibition sites in the preset inhibition site list. If, after comparing, it is found that the current longitude and latitude of the vehicle is consistent with or is within a certain range (e.g., within a range of diameter of 10 meters) of a specific longitude and latitude in the inhibition site list, the controller 103 does not send an intervention instruction (e.g., automatic emergency braking instruction) to the executing device 104. That is, the controller 103 inhibits the activation of the active safety function.

The executing device 104 is connected with the controller 103. The executing device 104 may include braking system, power system, steering system, and so on. From above, if, after comparing, it is found that the current longitude and latitude of the vehicle is not consistent with or is not within a certain range (e.g., within a range of diameter of 10 meters) of a specific longitude and latitude in the inhibition site list, the controller 103 sends an intervention instruction (e.g., automatic emergency braking instruction) to the executing device 104, to cause the executing device 104 to perform the active safety function (e.g., automatic emergency braking).

It is noted from the above inhibition apparatus 100 for inhibiting misoperation of active safety function of vehicle, the longitudes and latitudes of the inhibition sites where misoperations of active safety function have occurred are preset in the inhibition site list of the controller 103. For example, if a metal speed bump exists on the road to cause vehicle to actively perform an automatic emergency braking, the longitude and latitude of the metal speed bump is collected and preset in the inhibition site list. When the vehicle passes through the metal speed bump, an automatic emergency braking is inhibited, such that misoperation of the automatic emergency braking is prevented. Thus, in the embodiment of the present application, by collecting and adding the longitudes and latitudes of the inhibition sites where misoperations of active safety function have occurred to the inhibition site list of the controller 103, it is realized to inhibit the activation of the active safety function at these inhibition sites where misoperations of active safety function have occurred, to thereby prevent happening of wrong work of active safety function and reduce user's complaints and hidden dangers of driving.

Figure 3:
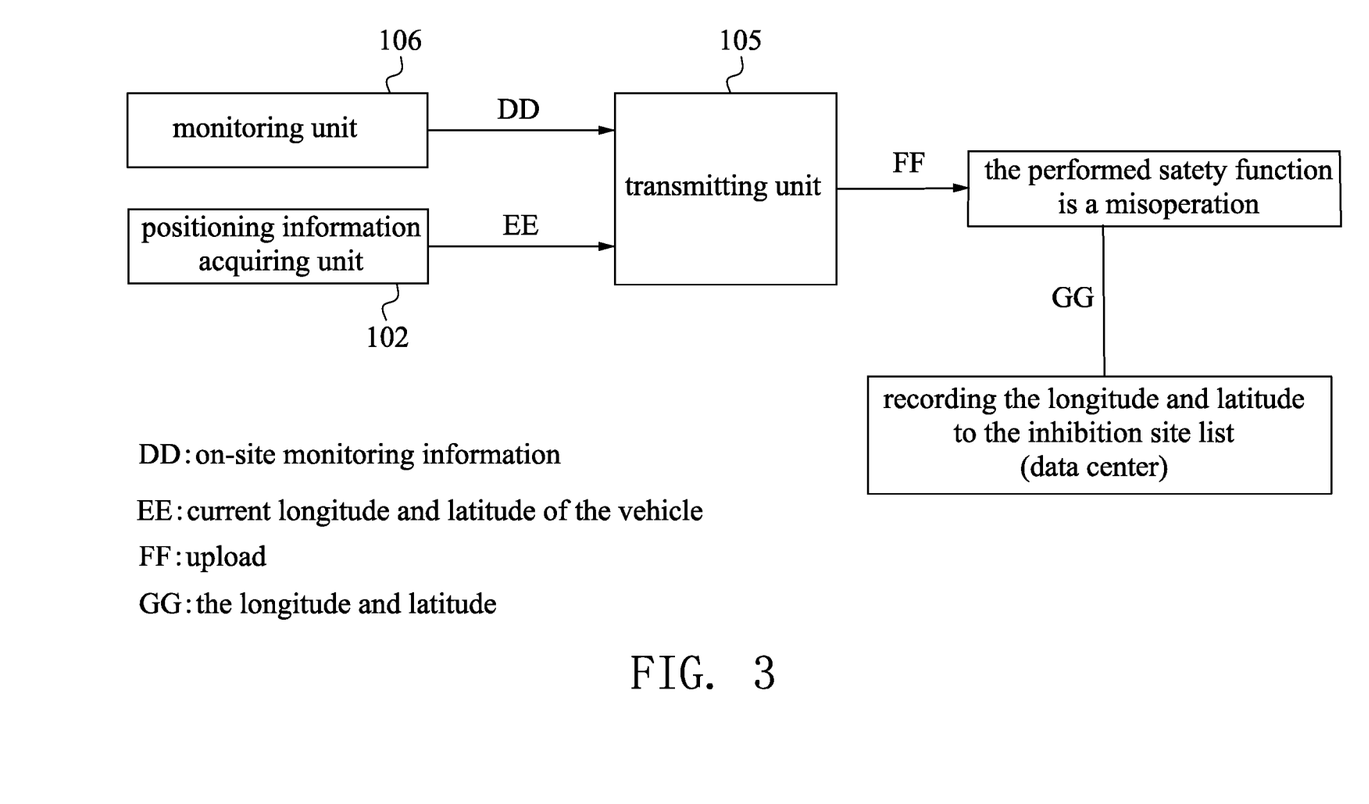
FIG. 3 is a diagram showing the longitudes and latitudes of the inhibition sites being collected via Internet of Vehicles.

The longitude and latitude of the respective inhibition sites in the inhibition site list can be collected by monitoring the activation states of active safety function among different vehicles through Internet of Vehicles. Referring to FIG. 3, the inhibition apparatus in the embodiment of the present application further includes a transmitting unit 105 and a monitoring unit 106. The transmitting unit 105 is connected with the monitoring unit 106 and the position information acquiring unit 102. When the vehicle performs an active safety function (e.g., automatic emergency braking) each time, the monitoring unit 106 captures the on-site monitoring information at the site where an active safety function is performed, and the longitude and latitude of the site where the active safety function is performed together with the on-site monitoring information are uploaded to the Internet by the transmitting unit 105. The monitoring unit 106 may be on-board camera, the on-site monitoring information may be a video recorded by the camera at the site where the active safety function is performed. After the on-site monitoring information is uploaded to the Internet, it can be determined by staffs whether the active safety function performed is a misoperation according to the on-site monitoring information (e.g., according to the video). If it is determined that the active safety function performed is a misoperation according to the on-site monitoring information, the longitude and latitude of the site where the active safety function is performed, is recorded and stored in an inhibition site list of a data center. The inhibition site list in the data center is specially used to record and store the longitudes and latitudes of the inhibition sites where misoperations of active safety function have occurred by feedback from users through Internet of Vehicles. If it is determined that the active safety function performed is not a misoperation according to the on-site monitoring information, the longitude and latitude of the site where the active safety function is performed, will not be recorded and stored in the inhibition site list of the data center. That is, the inhibition site list of the data center only records and stores the longitudes and latitudes of the inhibition sites where misoperations of active safety function have occurred. Thus, through Internet of Vehicles, the longitudes and latitudes of the inhibition sites where misoperations of active safety function have occurred, can be uploaded from vehicles of different users and recorded in the inhibition site list of the data center, so that vehicles of all users can share and download the inhibition site list.

Figure 4:
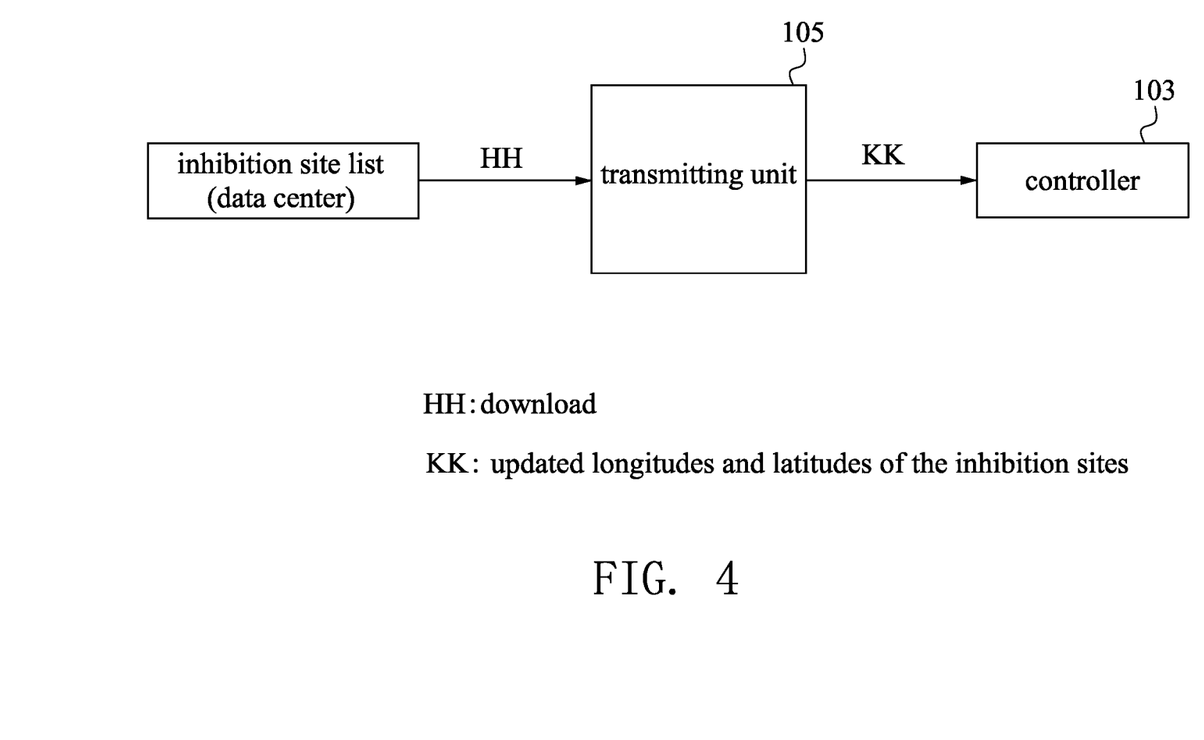
FIG. 4 is a diagram showing the inhibition site list being downloaded and updated to the user's vehicles via Internet of Vehicles.

The collected inhibition site list of the longitudes and latitudes of the inhibition sites can be updated to the vehicle through Internet of Vehicles, or be updated to the vehicle by upgrading the product software during maintenance of vehicle. When it is updated to the vehicle through Internet of Vehicles, as shown in FIG. 4, because the longitudes and latitudes of the inhibition sites where misoperations of active safety function have occurred, have been collected and recorded through Internet of Vehicles, the inhibition site list in the data center can be downloaded and updated to the controller 103 of the vehicle via the transmitting unit 105, to ensure real-time and accuracy of the data in the inhibition site list when it is preset in the controller 103.

Referring to FIG. 2, the embodiment of the present application further provides a method for inhibiting misoperation of active safety function of vehicle, including:

detecting the environmental information during vehicle driving; specifically, the external environment sensor 101 is used to detect the environmental information during vehicle driving;

acquiring the current longitude and latitude of the vehicle via a positioning system; specifically, the position information acquiring unit 102 is used to acquire the current longitude and latitude of the vehicle via the positioning system;

determining whether the vehicle needs an intervention of an active safety function according to the detection result; specifically, the controller 103 determines whether the vehicle needs an intervention of an active safety function (e.g., automatic emergency braking) according to the detection result of the external environment sensor 101;

when the vehicle needs an intervention of an active safety function, comparing the current longitude and latitude of the vehicle with the longitudes and latitudes of inhibition sites in a preset inhibition site list, wherein the inhibition site list includes the longitudes and latitudes of the inhibition sites where misoperations of active safety function have occurred. Specifically, the inhibition site list with the longitudes and latitudes of the inhibition sites is preset in the controller 103 of the vehicle. The longitude and latitude of the respective inhibition sites in the inhibition site list can be obtained through vehicle road test or user's feedback;

if, after comparing, the current longitude and latitude of the vehicle is consistent with or is within a certain range of a specific longitude and latitude in the inhibition site list, inhibiting the activation of the active safety function, i.e., does not send an intervention instruction to the executing device 104; and if, after comparing, the current longitude and latitude of the vehicle is not consistent with or is not within a certain range of a specific longitude and latitude in the inhibition site list, sending an intervention instruction to activate the active safety function, i.e., sending an intervention instruction to the executing device 104, to cause the executing device 104 to perform the active safety function (e.g., automatic emergency braking).

Further, the method further includes uploading the longitude and latitude of the site where an active safety function is performed together with on-site monitoring information to the Internet through Internet of Vehicles, and if it is determined that the active safety function performed is a misoperation according to the on-site monitoring information, recording the longitude and latitude of the site where the active safety function is performed in an inhibition site list of a data center.

Further, the method further includes downloading the inhibition site list from the data center to the controller 103 of the vehicle through Internet of Vehicles.

In addition, map databases in cloud servers may also contain construction sites and road congestion information. The method may further include adding such information into the inhibition site list and inhibiting the activation of active safety function according to such information. For example, when the vehicle passes through a construction site, the active safety function (e.g., automatic emergency braking) is inhibited to be not activated.

In an embodiment, the present application further provides a vehicle having active safety function, and the vehicle includes the above-mentioned inhibition apparatus 100 for inhibiting misoperation of active safety function of vehicle. By the inhibition apparatus 100, activation of active safety function is inhibited at inhibition sites where misoperations of active safety function have occurred. That is, the active safety function is inhibited to be not activated at these inhibition sites, to thereby prevent wrong work of active safety vehicle.

An ordinary person skilled in the art can understand that all or part of the steps in the above method can be completed by a computer program instructing related hardware, and the program can be stored in a computer readable memory medium. When the program is executed, the steps in the above method are carried out, wherein the memory medium may include hard disk, optical disk, read-only memory (ROM), random access memory (RAM), and so on.

The above are embodiments of the present application only, and should not be deemed as limitations to the present application. Although the present application has been disclosed in embodiments as above, it is not intended to limit the present application. It should be noted that variations and improvements will become apparent to those skilled in the art to which the present application pertains. Therefore, the scope of the present application is defined by the appended claims.

INDUSTRIAL APPLICABILITY

In the embodiment of the present application, by presetting the longitudes and latitudes of the inhibition sites where misoperations of active safety function have occurred in the inhibition site list of the controller, it is realized to inhibit the activation of the active safety function at these inhibition sites where misoperations of active safety function have occurred, to thereby prevent happening of wrong work of active safety function and reduce user's complaints and hidden dangers of driving.

What is claimed is:

1. A method for inhibiting misoperation of active safety function of vehicle, comprising:

detecting the environmental information during vehicle driving;

acquiring the current longitude and latitude of the vehicle via a positioning system;

determining whether the vehicle needs an intervention of an active safety function according to the detection result;

when the vehicle needs an intervention of the active safety function, then comparing the current longitude and latitude of the vehicle with the longitudes and latitudes of inhibition sites in a preset inhibition site list, wherein the inhibition site list includes the longitudes and latitudes of the inhibition sites where misoperations of active safety function have occurred;

if, after comparing, the current longitude and latitude of the vehicle is consistent with or is within a certain range of a specific longitude and latitude in the inhibition site list, inhibiting the activation of the active safety function; and if, after comparing, the current longitude and latitude of the vehicle is not consistent with or is not within a certain range of a specific longitude and latitude in the inhibition site list, sending an intervention instruction to activate the active safety function;

wherein the longitudes and latitudes of the inhibition sites where misoperations of active safety function have occurred are collected from different vehicles and uploaded to the Internet for being stored in an inhibition site list of a data center, so that the inhibition site list in the data center can be downloaded from the Internet and updated to a controller of the vehicle;

wherein the inhibition site list with the longitudes and latitudes of the inhibition sites is preset in the controller of the vehicle;

wherein the method further comprises adding construction sites and road congestion information into the inhibition site list.

2. The method for inhibiting misoperation of active safety function of vehicle of claim 1, wherein the longitude and latitude of the respective inhibition sites in the inhibition site list can be obtained through vehicle road test or user's feedback.

3. The method for inhibiting misoperation of active safety function of vehicle of claim 1, wherein the method further comprises uploading the longitude and latitude of the site where an active safety function is performed together with on-site monitoring information to the Internet through Internet of Vehicles, and if it is determined that the active safety function performed is a misoperation according to the on-site monitoring information, recording the longitude and latitude of the site where the active safety function is performed in an inhibition site list of a data center.

4. The method for inhibiting misoperation of active safety function of vehicle of claim 3, wherein the method further comprises downloading the inhibition site list from the data center to the controller of the vehicle through Internet of Vehicles.

5. An apparatus for inhibiting misoperation of active safety function of vehicle, comprising:

an external environment sensor, being configured for detecting the environmental information during vehicle driving;

a position information acquiring unit, being configured for acquiring the current longitude and latitude of the vehicle via a positioning system;

a controller, being connected with the external environment sensor and the position information acquiring unit;

an executing device, being connected with the controller;

wherein an inhibition site list is preset in the controller, the inhibition site list includes the longitudes and latitudes of inhibition sites where misoperations of active safety function have occurred, the controller determines whether the vehicle needs an intervention of an active safety function according to the detection result of the external environment sensor, when the vehicle needs an intervention of the active safety function, the controller then compares the current longitude and latitude of the vehicle with the longitudes and latitudes of the inhibition sites in the inhibition site list;

if, after comparing, the current longitude and latitude of the vehicle is consistent with or is within a certain range of a specific longitude and latitude in the inhibition site list, the controller does not send an intervention instruction to the executing device;

if, after comparing, the current longitude and latitude of the vehicle is not consistent with or is not within a certain range of a specific longitude and latitude in the inhibition site list, the controller sends an intervention instruction to the executing device, to cause the executing device to perform the active safety function;

wherein the longitudes and latitudes of the inhibition sites where misoperations of active safety function have occurred are collected from different vehicles and uploaded to the Internet for being stored in an inhibition site list of a data center, so that the inhibition site list in the data center can be downloaded from the Internet and updated to a controller of the vehicle;

wherein the inhibition site list with the longitudes and latitudes of the inhibition sites is preset in the controller of the vehicle;

wherein the method further comprises adding construction sites and road congestion information into the inhibition site list.

6. The apparatus for inhibiting misoperation of active safety function of vehicle of claim 5, wherein the apparatus further comprises an transmitting unit and a monitoring unit, the transmitting unit is connected with the monitoring unit and the position information acquiring unit, the monitoring unit captures on-site monitoring information at the site where an active safety function is performed, the transmitting unit uploads the longitude and latitude of the site where the active safety function is performed together with the on-site monitoring information to the Internet, and the transmitting unit further downloads the inhibition site list recorded with the longitudes and latitudes of the inhibition sites from the Internet to the controller of the vehicle.

7. The apparatus for inhibiting misoperation of active safety function of vehicle of claim 6, wherein the monitoring unit is on-board camera, the on-site monitoring information is a video recorded by the camera at the site where the active safety function is performed.

8. A vehicle comprising the apparatus for inhibiting misoperation of active safety function of vehicle of claim 5.

* * * * *